(No Model.)
E. D. JOHNSON.
SAW MILL DOG.
No. 342,361. Patented May 25, 1886.
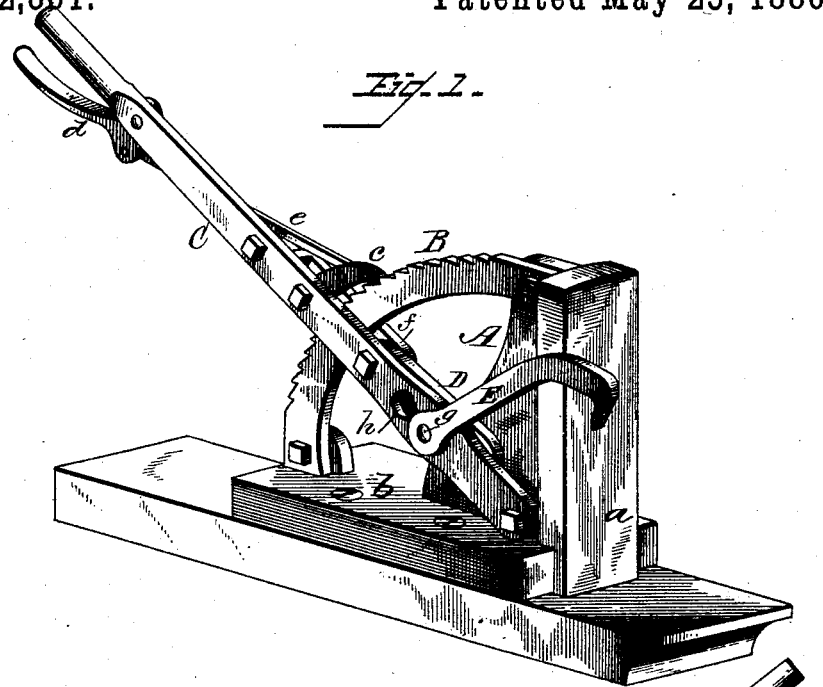
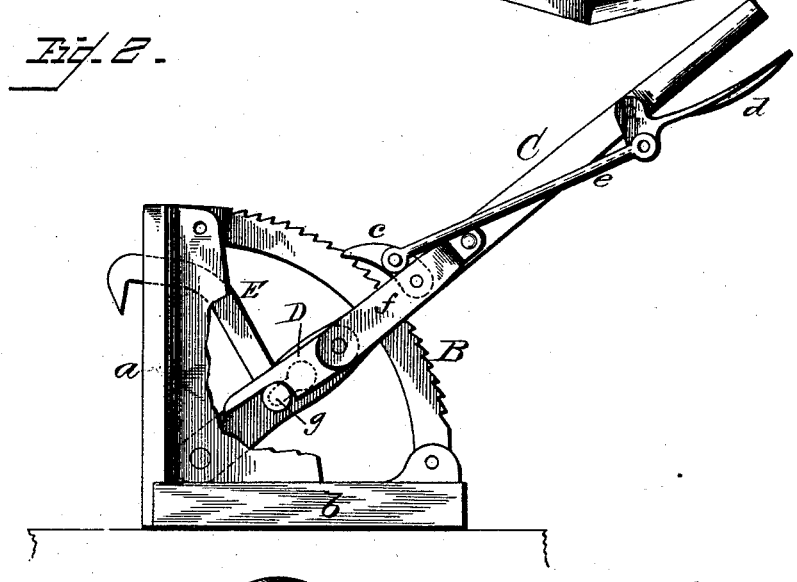
Witnesses
Inventor
Elijah D. Johnson.
By his Attorney

UNITED STATES PATENT OFFICE.

ELIJAH D. JOHNSON, OF MILTON, FLORIDA.

SAW-MILL DOG.

SPECIFICATION forming part of Letters Patent No. 342,361, dated May 25, 1886.

Application filed December 16, 1885. Serial No. 185,791. (No model.)

*To all whom it may concern:*

Be it known that I, ELIJAH D. JOHNSON, a citizen of the United States, residing at Milton, in the county of Santa Rosa and State of Florida, have invented certain new and useful Improvements in Saw-Mill Dogs; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a side elevation showing the frame partly broken away, and Fig. 3 a detail view in perspective of the dog proper.

The object of the present invention is to provide a simple and easily operating dog for saw-mills, whereby the log is securely and firmly held on the carriage while being sawed; and it consists in the details of construction substantially as shown in the drawings, and hereinafter described and claimed.

In the accompanying drawings, A represents a suitable frame consisting of the standard $a$ and base $b$, said frame being attached to the head-block of the saw-mill in any suitable manner.

The frame A is provided with a segmental rack-bar, B, and to the frame is pivoted one end of an operating-lever, C, carrying a pivoted pawl, $c$, connected to a supplemental lever, $d$, by an intermediate rod, $e$. The lever $d$ is pivoted to the lever C near its end, so that both levers can be grasped by one and the same hand, and the pawl $c$ is pivoted between the lever C and a bent bar or link, $f$.

Between the link or bar $f$ and the lever C is pivoted one end of a latch, D, the free end thereof resting on a headed pin, $g$, projecting from the side of the dog E at its lower end. The pin $g$ passes through a lock-slot, $h$, in the lever C, and is retained in engagement therewith by the latch D.

When it is desired to remove the dog E and replace it with another of different size, the pivoted latch D is thrown back and the dog moved back until the head of the pin $g$ is in line with or opposite the larger end of the slot, when the pin will pass through the slot, thus enabling the dog to be detached and another substituted, the dog catching the log and drawing it up to the standard $a$, and holding it firmly thereto while being sawed.

By raising or lowering the outer end of the lever C the dog E will catch different sizes of logs without the necessity of driving or bringing the log up to the standard, and by releasing with the hand the supplemental lever $d$ the pawl $c$ will engage with the teeth on the rack-bar B, to hold the main lever stationary.

Having now fully described my invention, what I claim as new, and desire to secure by Letters Patent, is—

1. In a saw-mill dog, the combination, with a suitable segmental rack-bar, of a pivoted lever carrying a pawl and a pivoted latch, and the dog proper, provided with a headed pin engaging with a lock-slot in the lever, substantially as and for the purpose set forth.

2. In a saw-mill dog, a frame provided with a segmental rack-bar, in combination with a pivoted lever, a pawl pivoted thereto and connected to a supplemental lever by an intermediate rod, and a detachable dog held in engagement with the main lever by a pivoted latch, substantially as and for the purpose specified.

In testimony that I claim the above I have hereunto subscribed my name in the presence of two witnesses.

ELIJAH D. JOHNSON.

Witnesses:
WM. J. JOHNSON,
R. R. SHEPPARD.